Nov. 18, 1958     O. P. LANCE     2,860,892
CONNECTION FACILITATING VEHICLE DRAFT ASSEMBLY
Filed April 28, 1955
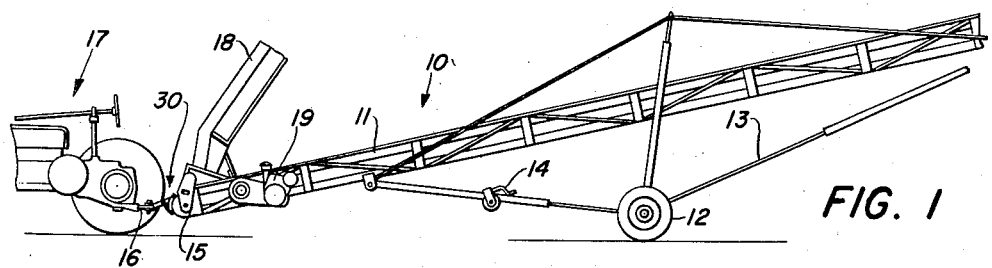
FIG. 1
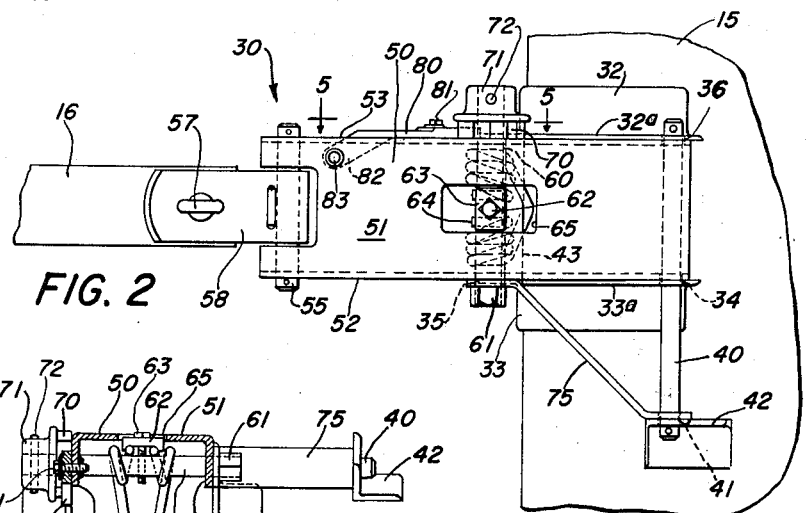
FIG. 2
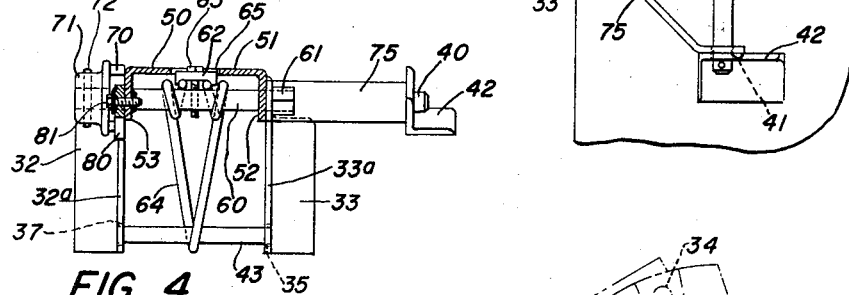
FIG. 4
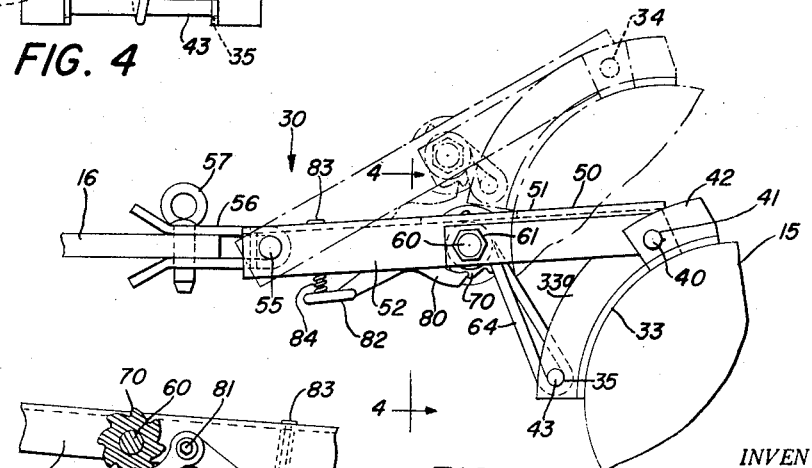
FIG. 3
FIG. 5
INVENTOR.
O. P. LANCE United States Patent Office 2,860,892
Patented Nov. 18, 1958

2,860,892

CONNECTION FACILITATING VEHICLE DRAFT ASSEMBLY

Orville P. Lance, Moline, Ill., assignor, by mesne assignments, to Deere & Company, a corporation of Delaware Application April 28, 1955, Serial No. 504,417

5 Claims. (Cl. 280—477)

This invention relates to a hitch device and more particularly to the type of hitch device which is operative to attach a trailing implement to a rearwardly projecting drawbar on a tractor or other type of draft vehicle, the implement being of the type which is normally mounted on transversely spaced wheels and is overbalanced at its forward end to cause that end to engage the ground when not being transported. Such a type of implement is the portable type elevator.

The usual type of portable elevator has a long crop or material conveyor which is mounted at its center or slightly to the rear of its center on a supporting wheel structure. The framework mounting the conveyor on the supporting wheel structure is normally adjustable to regulate the angle of inclination of the conveyor relative to the ground. Associated with the forward end of the conveyor is a material- or crop-receiving hopper which is normally horizontal and adjacent to the ground when in operating position and which may be turned upwardly and back on the conveyor when the elevator is being transported. Therefore, there is created an over-balanced condition at the forward end of the elevator which, unless otherwise restricted, results in its resting on the ground which is its normal position when in operation. Thus, to transport the elevator, its forward end must first be raised to enable hitching to a tractor or other draft vehicle. When the elevator is relatively light-weight, raising it creates no problem inasmuch as it may be done manually but in raising heavier elevators, a mechanical lift or other mechanical advantage means is required.

It is the primary object of this invention to provide a mechanical lift in a hitch device connecting an elevator to a tractor, which is relatively simple and inexpensive to manufacture and which may readily be attached to the hitch device.

It is also an object of the present invention to provide a simple lock on the above mechanical lift which will permit the elevator to gravitate from a transport position in a restricted manner, thereby eliminating damage to the elevator by permitting unrestricted dropping.

Other objects and advantages of the invention will become apparent to those skilled in the art as the nature of the invention is better understood from the following detailed description illustrated in the accompanying drawings.

Fig. 1 is a side elevation of portions of a tractor and elevator which incorporates the use of the subject hitch device.

Fig. 2 is a plan view of the hitch device and portions of the tractor drawbar and forward end of the elevator.

Fig. 3 is a side elevation of the parts shown in Fig. 2.

Fig. 4 is a sectional view taken along the line 4—4 of Fig. 3.

Fig. 5 is a sectional view taken along line 5—5 of Fig. 2.

The implement or elevator 10 is of a conventional design; consequently, description of it shall be made generally and not in detail and only sufficient for purposes of fully understanding the use and operation of the particular hitch device. For a more complete description of the elevator, reference is made to U. S. Patent 2,604,203. The elevator is made up of a fore-and-aft elongated material conveyor 11 which is mounted on a pair of transversely spaced wheels 12 by means of an adjustable framework 13. A crank, as at 14, is used to manually adjust the framework so as to vary the angle of inclination of the conveyor relative to the ground level. As shown in Fig. 1, a forward or boot end 15 extends to a position proximate to an implement connecting means or drawbar 16 which projects rearwardly from a tractor 17. Pivotally mounted for vertical movement from a horizontal position to a folded position, as shown, is a material collecting hopper 18. Also mounted proximate to the forward end of the elevator is an elevator driving mechanism, as indicated at 19.

Connecting the forward end of the elevator 15 to the tractor drawbar 16 is a hitch device indicated in its entirety by the reference numeral 30. The hitch device is fixed to the forward end 15 of the elevator by means of right and left hand angle iron support brackets 32, 33, left and right being determinable by viewing the elevator from the rear, each having a laterally disposed section conforming to the shape of the forward end of the elevator and fixed thereto by welding or any other suitable means, and a pair of parallel and arcuate shaped upright portions 32a and 33a. The left upright portion 33a is apertured, as at 34 and 35, and the right upright portion 32a is apertured, as at 36 and 37. The apertures of each bracket are in transverse alinement with the corresponding apertures in the opposite bracket. A transverse shaft 40 extends through the upper apertures 34 and 36 and through an aperture 41 in a short angle iron bracket 42 transversely spaced from the brackets 32 and 33 and which is also fixed to the surface of the forward end 15 of the elevator. The apertures 35 and 37 support a lower transverse shaft 43.

A fore-and-aft extending plate member 50, having a laterally disposed portion 51 and left and right depending side portions 52 and 53, is pivotally connected at its rear end by the transverse shaft 40 which extends through suitable openings or apertures in the side portions. As shown in Fig. 2, the side portions 52 and 53 are positioned adjacent to and inwardly of the upright portions 32a and 33a of the brackets 32 and 33. The forward end of the plate member extends to a position proximate to the tractor drawbar 16 and has at its forward end a transverse pivot pin 55 which extends through the respective side portions 52 and 53. The pin 55 carries a clevis 56 which operates with a drop pin 57 as connecting means for attaching the front end of the plate member 50 to the tractor drawbar 16.

Midway between the front and rear ends of the plate member 50 is a transverse drivable shaft 60 which extends through suitable openings in the respective side portions 52 and 53 in the plate member 50. The left end of the shaft 60 extends outwardly of the left side plate 52 and has fixed thereto an enlarged hexagonal cross-sectioned portion 61 which will receive a suitable tool or wrench for driving or turning the shaft 60. The portion 61 is fixed to the shaft 60 by welding or any other suitable manner. A clamping plate 62 is connected to the mid-portion of the driveable shaft 60 by means of a bolt 63 which is adjustable in a tapped bore in the shaft 60. The clamping plate 62 and threaded member 63 operate as connecting means for securing both ends of a flexible member or cable 64 to the transverse shaft 60. The mid-portion of the cable 64 extends beneath and around the lower transverse retaining member or shaft 43. An opening 65 is provided in the plate member 50 to permit access to the clamping members 62 and 63 from above.

A ratchet 70 having an integral hub 71 is mounted on the right end of the transverse shaft 60 by means of a pin 72 which extends diametrically through the hub and shaft 60. As shown in Figs. 2 and 4, the ratchet and hub are mounted outwardly of the side portion 53. A rearwardly and diagonally extending brace 75 has one end thereof that extends between the enlarged hexagonal end 61 and the left side poriton 52 and has the other end pivotally mounted on the transverse shaft 40 and adjacent to the shortened bracket 42. The brace 75 serves to stabilize the forward end of the plate member 50 against lateral movement.

A pawl 80 is mounted on the right side portion 53 of the plate member 50 by a bolt 81. The pawl 80 co-operates with the ratchet 70 and serves as one-way lock means, as will later become apparent, to maintain the forward end of the elevator in the up or transport position. A forward extension or portion 82 of the pawl is turned under the plate member 50 and is connected to the lateral portion 51 by means of a pin 83 which is operative to move vertically through the plate 50. Surrounding the pin 83 is a spring 84 which is positioned between the laterally disposed portion 51 of the plate member 50 and the forward portion 82 of the pawl to normally bias the pawl and ratchet in a locked or engaged condition.

The mode of operation of the hitch device is best shown in Fig. 3. The tractor drawbar 16 is normally at a fixed height relative to the ground. The forward end 15 of the elevator as shown in full lines is in its ground-engaging or operating position. The plate member 50 in this position is substantially horizontal and may be connected to the tractor drawbar by sliding the clevis 56 over the drawbar and placing the drop pin 57 through the suitable openings in the clevis and drawbar. The forward end of the elevator may be raised from its ground-engaging position to its transport or raised position, indicated in dotted representation in Fig. 3, by placing a suitable tool or wrench over the hexagonal portion 61 of the transverse shaft 60 and turning it in a counter-clockwise direction. This will result in the cable 64 winding about the shaft 60, thereby reducing the angular or vertical displacement between the member 50 and the shaft 43 and, inasmuch as the forward end of the plate member is fixed to the drawbar 16, causing the forward end of the elevator to rise. Should the operator desire to remove the wrench or tool from the hexagonal portion 61 to obtain either a new bite or for other purposes, the spring 84 will cause the pawl 80 to automatically engage a tooth of the ratchet 70, thereby preventing the forward end of the elevator from dropping. Likewise, when the forward end of the elevator is in the transport or raised position and it is desired to lower it, the pawl 80 may be selectively disengaged by manually compressing the spring 84, thereby permitting the cable 64 to unwind on the shaft 60 to cause the forward end of the elevator to be dropped or inched down by use of a tool or wrench on the hexagonal portion 61.

While only one form of the invention has been shown, it should be recognized that other forms and variations may exist without departing basically from the principles herein set forth. It should therefore be understood that while the preferred embodiment of the invention has been described with the view of clearly and concisely illustrating the invention, it is desired not to so limit or narrow the invention beyond that which is claimed.

What is claimed is:

1. An implement hitch device operative to attach a trailing implement with a draft vehicle having an implement connecting means at a fixed height relative to the ground, the implement being of the type rockably mounted on transverse wheel means and overbalanced to cause, unless otherwise restricted, a portion forward of the wheel means to engage the ground; said hitch device comprising: a plate member including a laterally disposed plate portion having front and rear ends and a pair of depending side portions extending from transversely spaced edges of the plate portion, said plate member being mounted for vertical swinging at its rear end to a forward portion of the implement and at its front end to the implement connecting means; a flexible element disposed beneath the plate member and between the side portions connected to the forward portion of the implement; a transverse drivable shaft rotatably supported on the side portions of the plate member; connecting means, on the shaft between the depending portions for engaging the flexible element to cause the flexible element to wind about the shaft upon rotation in one direction thereby raising the forward end of the implement and to unwind upon rotation in the opposite direction thereby permitting the forward end of the implement to gravitate.

2. The invention defined in claim 1, in which the flexible element is a cable and is connected to the forward portion of the implement by passing it around a retaining member fixed to the implement and is connected to the drivable shaft by means of a clamp which secures opposite ends of the cable to the shaft.

3. The invention defined in claim 2, in which the drivable shaft has opposite ends thereof projecting outwardly of the respective side portions and one of said ends has means thereon for engagement with an outside source for rotating the shaft, and the other end has means thereon engageable with a stop on the rigid member for selectively permitting rotation of the shaft.

4. The invention defined in claim 1, further characterized by means operative between the rigid member and shaft to selectively lock the shaft against rotation.

5. An implement hitch device operative to attach a trailing implement with a draft vehicle having an implement connecting means at a fixed height relative to the ground, the implement being of the type rockably mounted on transverse wheel means and overbalanced to cause, unless otherwise restricted, a portion forward of the wheel means to engage the ground; said hitch device comprising: a plate member including a laterally disposed plate portion having front and rear ends and a pair of depending side portions extending from transversely spaced edges of the plate portion, said plate member being mounted for vertical swinging at its rear end to a forward portion of the implement and at its front end to the implement connecting means; a flexible element disposed beneath the plate member and connected to the forward portion of the implement; a transverse drivable shaft rotatably supported on the side portions of the plate member and having one end thereof extending outwardly of a side portion connecting means on the shaft between the side portions for engaging the flexible element to cause the flexible element to wind about the shaft upon rotation in one direction thereby raising the forward end of the implement and to unwind upon rotation in the opposite direction thereby permitting the forward end of the implement to gravitate, a ratchet fixed to said end of the transverse shaft adjacent the side portion, a pawl pivotally mounted on the latter side portion of the plate member and associated with the ratchet to prevent unwinding of the flexible member on the shaft, and means extending between the pawl and the plate member normally biasing the pawl into engagement with the ratchet.

References Cited in the file of this patent

UNITED STATES PATENTS

| | | |
|---|---|---|
| 1,398,575 | Ruggles | Nov. 29, 1921 |
| 1,943,594 | Flatley | Jan. 16, 1934 |
| 2,328,343 | Jacob | Aug. 31, 1943 |
| 2,411,009 | Slimp | Nov. 12, 1946 |
| 2,718,410 | Simmons | Sept. 20, 1955 |

FOREIGN PATENTS

| | | |
|---|---|---|
| 510,241 | France | Nov. 29, 1920 |
| 541,887 | Germany | Jan. 18, 1933 |
| 643,951 | Germany | June 1, 1937 |
| 910,247 | Germany | Apr. 29, 1954 |